US008355159B2

(12) United States Patent
Dobbertin et al.

(10) Patent No.: US 8,355,159 B2
(45) Date of Patent: Jan. 15, 2013

(54) PRINT ENGINE SPEED COMPENSATION

(75) Inventors: Michael T. Dobbertin, Honeoye, NY (US); Thomas K. Sciurba, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 760 days.

(21) Appl. No.: 12/468,298

(22) Filed: May 19, 2009

(65) Prior Publication Data

US 2010/0296108 A1 Nov. 25, 2010

(51) Int. Cl.

| | |
|---|---|
| ***G06K 15/22*** | (2006.01) |
| ***G06K 15/10*** | (2006.01) |
| ***G06K 1/00*** | (2006.01) |
| ***G06K 15/00*** | (2006.01) |
| ***H04N 1/00*** | (2006.01) |
| ***H04N 1/60*** | (2006.01) |
| ***G06F 3/12*** | (2006.01) |
| ***G03G 15/02*** | (2006.01) |
| ***G03G 15/20*** | (2006.01) |
| ***G03G 15/00*** | (2006.01) |
| ***H02P 1/46*** | (2006.01) |
| ***H02P 1/54*** | (2006.01) |

(52) U.S. Cl. ............ 358/1.4; 358/1.5; 358/1.6; 358/1.9; 358/1.12; 358/1.13; 358/1.18; 399/162; 399/309; 399/364; 399/384; 318/34; 318/41; 318/700

(58) Field of Classification Search ........................ None
See application file for complete search history.

(56) References Cited

U.S. PATENT DOCUMENTS

| | | | | |
|---|---|---|---|---|
| 6,144,024 | A | 11/2000 | Rushing | |
| 6,222,176 | B1 | 4/2001 | Rushing et al. | |
| 6,225,618 | B1 | 5/2001 | Rushing et al. | |
| 6,229,972 | B1 | 5/2001 | Rushing | |
| 6,331,832 | B1 | 12/2001 | Rushing | |
| 6,417,643 | B1 * | 7/2002 | Shiba et al. | 318/700 |
| 6,567,171 | B1 | 5/2003 | Rushing | |
| 6,621,585 | B1 * | 9/2003 | Patel et al. | 358/1.12 |
| 6,671,052 | B1 | 12/2003 | Rushing | |
| 6,791,485 | B1 | 9/2004 | Rushing | |
| 7,245,856 | B2 | 7/2007 | Furst et al. | |
| 2003/0048313 | A1 | 3/2003 | Frodl et al. | |
| 2003/0077095 | A1 | 4/2003 | Conrow | |
| 2003/0098984 | A1 * | 5/2003 | Botten et al. | 358/1.4 |
| 2003/0165349 | A1 | 9/2003 | Nakazawa | |
| 2006/0039728 | A1 | 2/2006 | DeJong et al. | |
| 2006/0233569 | A1 * | 10/2006 | Furst et al. | 399/162 |
| 2007/0229858 | A1 * | 10/2007 | Tomaru | 358/1.4 |

* cited by examiner

*Primary Examiner* — Hilina S Kassa
(74) *Attorney, Agent, or Firm* — Donna P. Suchy

(57) ABSTRACT

A method of synchronizing the timing of a plurality of physically coupled print engines wherein the receiving sheet is inverted between a first and a second print engine including determining any change in the speed of the master print engine relative to the speed at original set up and adjusting the timing parameters within the slave print engines based on the speed of the master engine.

13 Claims, 6 Drawing Sheets

PRINT ENGINE SPEED COMPENSATION

CROSS REFERENCE TO RELATED APPLICATIONS

This application relates to commonly assigned, copending U.S. application Ser. No. 12/468,286, filed May 19, 2009, entitled: "DUAL ENGINE SYNCHRONIZATION", U.S. application Ser. No. 12/468,304 filed May 19, 2009, entitled: "SCALING IMAGE IN A DUAL ENGINE SYSTEM", and U.S. application Ser. No. 12/468,315, filed May 19, 2009, entitled: "SCALING IMAGES USING MATCHED COMPONENTS IN A DUAL ENGINE SYSTEM", each of which is hereby incorporated herein by reference in its entirety.

FIELD OF THE INVENTION

This invention relates to a process of synchronizing a plurality of coupled digital print engines while running that corrects for speed variations.

BACKGROUND OF THE INVENTION

In typical commercial reproduction apparatus (electrographic copier/duplicators, printers, or the like), a latent image charge pattern is formed on a primary imaging member (PIM) such as a photoreceptor used in an electrophotographic printing apparatus. While the latent image can be formed on a dielectric PIM by depositing charge directly corresponding to the latent image, it is more common to first uniformly charge a photoreceptive PIM member. The latent image is then formed by area-wise exposing the PIM in a manner corresponding to the image to be printed. The latent image is rendered visible by bringing the primary imaging member into close proximity to a development station. A typical development station may include a cylindrical magnetic core and a coaxial nonmagnetic shell. In addition, a sump may be present containing developer which includes marking particles, typically including a colorant such as a pigment, a thermoplastic binder, one or more charge control agents, and flow and transfer aids such as submicrometer particles adhered to the surface of the marking particles. The submicrometer particles typically include silica, titania, various lattices, etc. The developer also typically includes magnetic carrier particles such as ferrite particles that tribocharge the marking particles and transport the marking particles into close proximity to the PIM, thereby allowing the marking particles to be attracted to the electrostatic charge pattern corresponding to the latent image on the PIM, thereby rendering the latent image into a visible image.

The shell of the development station is typically electrically conducting and can be electrically biased so as to establish a desired difference of potential between the shell and the PIM. This, together with the electrical charge on the marking particles, determines the maximum density of the developed print for a given type of marking particle.

The image developed onto the PIM member is then transferred to a suitable receiver such as paper or other substrate. This is generally accomplished by pressing the receiver into contact with the PIM member while applying a potential difference (voltage) to urge the marking particles towards the receiver. Alternatively, the image can be transferred from the primary imaging member to a transfer intermediate member (TIM) and then from the TIM to the receiver.

The image is then fixed to the receiver by fusing, typically accomplished by subjecting the image bearing receiver to a combination of heat and pressure. The PIM and TIM, if used, are cleaned and made ready for the formation of another print.

A printing engine generally is designed to generate a specific number of prints per minute. For example, a printer may be able to generate 150 single-sided pages per minute (ppm) or approximately 75 double-sided pages per minute with an appropriate duplexing technology. Small upgrades in system throughput may be achievable in robust printing systems. However, the doubling of throughput speed is mainly unachievable without a) purchasing a second reproduction apparatus with throughput identical to the first so that the two machines may be run in parallel, or without b) replacing the first reproduction apparatus with a radically redesigned print engine having double the speed. Both options are very expensive and often with regard to option (b), not possible.

Another option for increasing printing engine throughput is to utilize a second print engine in series with a first print engine. For example, U.S. Pat. No. 7,245,856 discloses a tandem print engine assembly which is configured to reduce image registration errors between a first side image formed by a first print engine, and a second side image formed by a second print engine. Each of the '856 print engines has a seamed photoreceptive belt. The seams of the photoreceptive belt in each print engine are synchronized by tracking a phase difference between seam signals from both belts. Synchronization of a slave print engine to a main print engine occurs once per revolution of the belts, as triggered by a belt seam signal, and the speed of the slave photoreceptor and the speed of an imager motor and polygon assembly are updated to match the speed of the master photoreceptor. Unfortunately, such a system tends to be susceptible to increasing registration errors during each successive image frame during the photoreceptor revolution. Furthermore, given the large inertia of the high-speed rotating polygon assembly, it is difficult to make significant adjustments to the speed of the polygon assembly in the relatively short time frame of a single photoreceptor revolution. This can limit the response of the '856 system on a per revolution basis, and make it even more difficult, if not impossible, to adjust on a more frequent basis.

In general, the timing offset of the first and second engines are determined by paper transport time from image transfer in the first engine to the image transfer in the second engine. If the sheet is inverted between the engines, the transport time can be a function of the receiver length. To compensate for varying receiver sheet sizes, one would either have to run the print engine assembly at a very high rate of speed to minimize the effects of receiver size. Alternatively, one can use the maximum size image frame for all receiver sizes. However, this would significantly reduce productivity.

Color images are made by printing separate images corresponding to an image of a specific color. The separate images are then transferred, in register, to the receiver. Alternatively, they can be transferred in register to a TIM and from the TIM to the receiver or they may be transferred separately to a TIM and then transferred and registered on the receiver. For example, a printing engine assembly capable of producing full color images may include at least four separate print engines or modules where each module or engine prints one color corresponding to the subtractive primary color cyan, magenta, yellow, and black. Additional development modules may include marking particles of additional colorants to expand the obtainable color gamut, clear toner, etc., as are known in the art. The quality of images produced on different print engines can be found to be objectionable if produced on different print engines even if the print engines are nominally the same, e.g. the same model produced by the same manufacturer. For example, the images can have slightly different sizes, densities or contrasts. These variations, even if small, can be quite noticeable if the images are compared closely.

In order to maximize productivity, different image frame sizes are utilized for different size receivers. Generally, the frame sizes are defined as preset portions of a primary imaging member in a printer such as equal portions that are from integral divisors of a primary imaging member (PIM), such as a photoreceptor, used in an electrophotographic engine. While this is often done to avoid a splice in a seemed PIM, it may be desirable for other reasons as well. For example, various process control algorithms may require that specific locations of a PIM be used solely for specific marks related to process control.

It is clearly important that certain image quality attributes, including size, print density, and contrast, match for prints made on separate print engines if those prints are subject to close scrutiny, as would be the case when a print made on a receiver sheet is produced on separate print engines. Specifically, the reflection density and the contrast of the prints need to closely match or the prints will be found to be objectionable to a customer. Even prints produced on two nominally identical digital printing presses such as electrophotographic printing presses described herein can vary in density and contrast due to variations in the photo-response of the PIM, variations in the charge or size of the marking particles, colorant dispersion variations within the batches of marking particles used in the separate engines, etc. It is clear that a method is needed to allow comparable prints to be produced on a plurality of engines.

SUMMARY OF THE INVENTION

The present invention is designed to correct speed variations in a digital print engine comprising multiple coupled modules. These modules may comprise separate print engines each of which can produce prints generally of a single color. The modules also can comprise modules having different functions such as an inverter that is designed to invert receiver sheets, thereby facilitating printing on both sides of the receiver, e.g. duplex printing, an inserter that is designed to insert receiver sheets in a manner generally designed to bypass all or most of the print modules and/or the inverter, etc. The tuning of the timing parameters of a plurality of physically coupled print engines is accomplished using a method including determining any change in the speed of the master print engine relative to the speed at original set up and adjusting the timing parameters within the slave print engines based on the speed of the master engine.

DETAILED DESCRIPTION OF THE INVENTION

Figure 1:
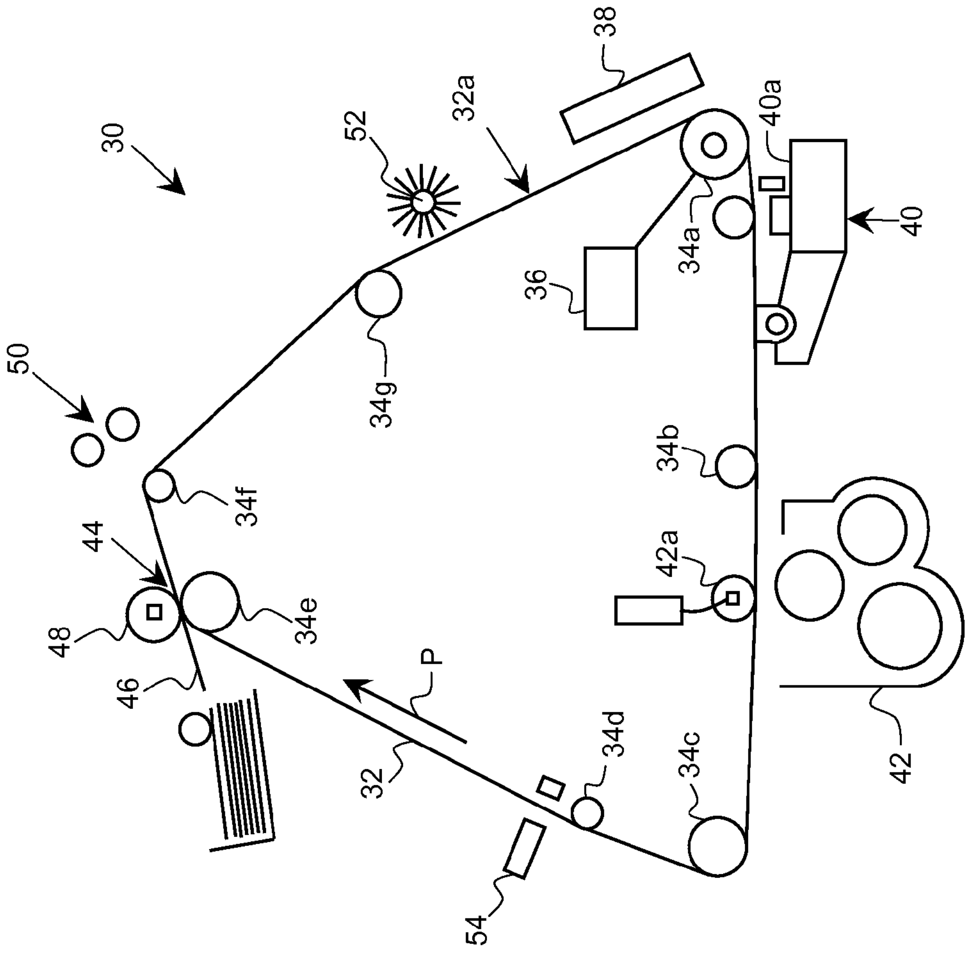
FIG. 1 schematically illustrates an embodiment of an electrophotographic print engine.

This patent describes a method and a related apparatus for compensating for speed variations in a digital print engine comprising a plurality of coupled modules. In some print engines, particularly electrophotographic print engines, it is cost effective to use different drive technologies for various subsystems, such as that used for driving the photoreceptor and receiver sheets. For example, the EX150 produced by Eastman Kodak uses an AC synchronous motor as the main drive for the majority of the printer including the photoreceptor and sections of the paper path that do not require independent speed control. Stepper motors with simple controllers are often used for sections of the paper path that need special control like registration, reversing nip inverters, and speed/timing adjust units. For this configuration, if the input line frequency changes, the main drive speed will change accordingly, but the sections driven by step motors will not. While it is possible to adjust the speed of the step motors to match the main drive speed, such necessary adjustment is complicated and costly. This invention teaches a method and apparatus to avoid such complexity, reduce cost, and increase reliability.

There are two problems than need to be addressed in transferring a receiver sheet from one module to another in an digital print engine such as an electrophotographic print engine comprising a plurality of modules including, but not limited to, a plurality of coupled modules each of which is designed to produce digital prints of at least a single color. First, the differential speed at the transition point from one section to the next can cause the receiver to buckle or crease.

The second problem relates to sheet delivery times. If the main drive speed changes but the speed of sections of the paper path do not, the sheet transport time through these sections will not match expected time and the sheet will not be delivered to the photoconductor at the proper time. Since the sections of the paper path that need independent control generally have timing parameters such as a timing pulse to synchronize with the photoconductor (e.g. feed pulse for the inverter after it reverses and dwells, synchronization pulse for Pre-Registration Adjust unit etc.), this can be adjusted to compensate for the change in main drive speed. The method currently used in the DigiMaster product line to accomplish this is described below. The main drive speed is measured when the timing is initially calibrated using the service programs. Every time the print engine starts, the main drive speed is measured and compared to the speed when the timing calibration was conducted. Based on these speeds, the timing parameters are modified accordingly based on a pre-determined formula or look up table to cause the sheet to arrive at the target time. U.S. Pat. No. 6,826,384, Dobbertin et al, describes a method to accomplish this compensation for print engines in the above configuration. This new invention relates to a method to accomplish this compensation as quickly as possible in dual engine configurations where the speed of the second engine is adjusted to match that of the first engine as described in U.S. patent application Ser. Nos. 12/126,192 and 12/126,267. Specifically, the measured speed of the master engine is used to calculate tuning adjustments for the timing parameters for both the master and slave engines. It is faster and more accurate to use the speed of the master engine as the basis since it takes some time for the slave engine speed to be adjusted to match the master engine so their relative speeds and relative timing are maintained.

Many applications in printing, especially digital printing and more particularly electrophotographic printing require that multiple print engines be sequentially ganged together to maximize printing efficiency. For example, as described in U.S. patent application Ser. Nos. 12/126,192 and 12/128,897, an electrophotographic printer can comprise two similar print engines that have been coupled together. A module termed a productivity module inverts the receiver sheets between the coupled modules, thereby allowing the production of duplex images to be formed on a receiver at the full process speed of an individual module, effectively doubling productivity.

To maximize printing efficiency and speed, the smallest frame size possible is generally chosen for a given size receiver. As described in U.S. patent application Ser. Nos. 12/126,192 and 12/126,267, for coupled print engine configurations, the image frames for a slave print engine must be synchronized to those in the master print engine so that sheets are delivered from to the slave engine at the correct time for a specific image frame. As described in U.S. patent application Ser. No. 12/128,897, the image frames must also be delayed to allow for the time required for the receiver to travel from the image transfer location in one engine to the corresponding location in the second engine. In some applications, as previously discussed, a digital print engine comprises two coupled printing modules separated by an inverter that flips the paper between the modules so that the second print engine forms a print on the reverse side of the receiver from that formed by the first print engine. For such applications, the inverter would have to transport the receiver at a high enough velocity to invert the longest receiver in the time normally allotted for inversion in the smallest image frame size mode if the same delay or temporal offset were used for all paper sizes. Because both the time to invert sheets and the time allotted for the corresponding image frames increase with receiver/image frame size, the optimum timing offset increases with image frame size. By intentionally defining different offsets for each frame mode, the inverter speed can be minimized without unduly compromising timing latitude. In other words, the timing latitude can be maximized for a given inverter speed.

The aforementioned patent applications disclose a method of synchronizing a slave print engine to a master by adjusting the appropriate print engine speed to achieve a consistent temporal offset between frame markers on the photoreceptors of the two print engines. According to these applications, the frame markers are physical markings such as perforations, splices, etc. If multiple frame modes are desired, it would be necessary to add additional markings for each frame of each mode. This is not desirable and, in some configurations such as when the PIM comprises a photoreceptive drum rather than a web, this is not even feasible. The timing marks can be marks printed on the PIM or transferred to a receiver. Alternatively, the marks can be generated signals controlled by a controller by sensing a location, such as a perforation, on the PIM. Thus these marks can be measured directly and be physical marks or be virtual marks that are actually electronic signals based on a location that can be determined using an encoder and the marks can be stored electronically in the engine control module.

In general, the timing offset of the first and second engines are determined by paper transport time from image transfer in the first engine to the image transfer in the second engine. If the sheet is inverted between the engines, the transport time can be a function of the receiver length. In order to obtain sufficient timing latitude to compensate for varying receiver sheet sizes, one could not run the inverter assembly at a very high rate of speed to minimize the effects of receiver size. Alternatively, one can use the maximum size image frame for all receiver sizes. However, this would significantly reduce productivity.

The optimum timing offset that is described in copending U.S. application Ser. No. 12/468,286, to allow synchronization is a function of the time required to transport the receiver from the image transfer location in the first print engine to that in the second print engine. As the timing offset can vary from printer to printer due to drive roller tolerances, the length or circumference of the photoreceptor, the paper path length, and engine to engine mating variations, it is necessary to provide a means to determine and set the required offset by a field engineer on the specific print engines. This is even more problematic when one is upgrading an existing single module print engine with a second print engine and, perhaps, even an inverter.

Copending U.S. application Ser. No. 12/468,286 describes a simple and direct method of achieving this synchronization using the optimum timing offset determined as described below. In that invention, the offset is set to a value corresponding to that for the smallest image frame size. Printing is initiated and the sheet arrival time is measured at a convenient point such as a registration or image transfer point. In order to minimize variability in this measurement, the sheets are directed in the non-invert path and the arrival time at the optical sensor in the Pre-Registration Assembly is measured relative to the slave engine image frame marker (F-Perf).

The average arrival time for a number of sheets is compared to the target arrival time. The target arrival time is defined as the nominal arrival time, which is the arrival time of the lead edge of the receiver sheet at a specified location in a print engine such as the aforementioned registration optical sensor which is an actual sheet arrival time under normal operating conditions but may vary because of a number of variations such as feed slippage, the fuser make up, receiver size and writer conditions. The synchronization offset is then adjusted accordingly so that the synchronization is optimized. Because the vast majority of the timing variability that needs to be calibrated is common for all frame modes, this service program is only run for the most stringent frame mode and that correction is applied to all modes. This program should be run whenever timing is likely to have changed significantly such as upon installation, replacement of parts or components, or when there has been significant wear. This can be signaled by a machine generated code indicating that the sheet arrival time is approaching the input latitude of the registration or likely to impinge upon a nonimagable portion of the PIM. Alternatively, this program can be run occasionally to reduce timing variability and prevent abrupt changes in timing.

Line frequency affects speeds of engine main drives, but not necessarily subcomponents of assemblies—some component speeds vary and some don't vary with line frequency. Synchronous motor speed varies with frequency whereas asynchronous varies with voltage and load. Asynchronous motors are cheaper, but line voltage varies more than frequency and is susceptible to load. DC servo is more expensive but more precise than either AC motors. DC servo is used in slave main drive because it needs to be precisely adjusted to compensate for other variations in drive speeds. It is clear than none of these alternatives are totally suitable for maintaining the synchronization of the modules in an digital print engine particularly an electrophotographic print engine comprising a plurality of coupled modules.

FIG. 1 schematically illustrates an embodiment of an electrophotographic print engine 30. The print engine 30 has a movable recording member such as a photoreceptive belt 32, which is entrained about a plurality of rollers or other supports 34*a* through 34*g*. The photoreceptive belt 32 may be more generally referred-to as a primary imaging member (PIM) 32. A primary imaging member (PIM) 32 may be any charge carrying substrate which may be selectively charged or discharged by a variety of methods including, but not limited to corona charging/discharging, gated corona charging/discharging, charge roller charging/discharging, ion writer charging, light discharging, heat discharging, and time discharging.

One or more of the rollers 34*a*-34*g* are driven by a motor 36 to advance the PIM 32. Motor 36 preferably advances the PIM 32 at a high speed, such as 20 inches per second or higher, in the direction indicated by arrow P, past a series of workstations of the print engine 30, although other operating speeds may be used, depending on the embodiment. In some embodiments, PIM 32 may be wrapped and secured about a single drum. In further embodiments, PIM 32 may be coated onto or integral with a drum.

It is useful to define a few terms that are used in relation to this invention. Optical density is the log of the ratio of the intensity of the input illumination to the transmitted, reflected, or scattered light, or $D=\log(I_i/I_o)$ where D is the optical density, $I_I$ is the intensity of the input illumination, $I_o$ is the intensity of the output illumination, and log is the logarithm to the base 10. Thus, an optical density of 0.3 means that the output intensity is approximately half of the input intensity which is desirable for quality prints.

For some applications, it is preferable to measure the intensity of the light transmitted through a sample such as a printed image. This is referred to as the transmission density and is measured by first nulling out the density of the substrate supporting the image and then measuring the density of the chosen region of the image by illuminating the image through the back of the substrate with a known intensity of light and measuring the intensity of the light transmitted through the sample. The color of the light chosen corresponds to the color of the light principally absorbed by the sample. For example, if the sample consists of a printed black region, white light would be used. If the sample was printed using the subtractive primary colors (cyan, magenta, or yellow), red, green, or blue light, respectively, would be used.

Alternatively, it is sometimes preferable to measure the light reflected or scattered from a sample such as a printed image. This is referred to as the reflection density. This is accomplished by measuring the intensity of the light reflected from a sample such as a printed image after nulling out the reflection density of the support. The color of the light chosen corresponds to the color of the light principally absorbed by the sample. For example, if the sample consists of a printed black region, white light would be used. If the sample was printed using the subtractive primary colors (cyan, magenta, or yellow), cyan, magenta, or yellow light, respectively, would be used.

A suitable device for measuring optical density is an X-Rite densitometer with status A filters. Some such devices measure either transmission or reflected light. Other devices measure both transmission and/or reflection densities. Alternatively, for use within a printing engine, densitometers such as those described by Rushing in U.S. Pat. Nos. 6,567,171, 6,144,024, 6,222,176, 6,225,618, 6,229,972, 6,331,832, 6,671,052, and 6,791,485 are well suited. Other densitometers, as are known in the art, are also suitable.

The size of the sample area required for densitometry measurements varies, depending on a number of factors such as the size of the aperture of the densitometer and the information desired. For example, microdensitomers are used to measure site-to-site variations in density of an image on a very small scale to allow the granularity of an image to be measured by determining the standard deviation of the density of an area having a nominally uniform density. Alternatively, densitometers also are used having an aperture area of several square centimeters. These allow low frequency variations in density to be determined using a single measurement. This allows image mottle to be determined. For simple determinations of image density, the area to be measured generally has a radius of at least 1 mm but not more than 5 mm.

The term module means a device or subsystem designed to perform a specific task in producing a printed image. For example, a development module in an electrophotographic printer would include a primary imaging member (PIM) such as a photoreceptive member and one or more development stations that would image-wise deposit marking or toner particles onto an electrostatic latent image on the PIM, thereby rendering it into a visible image. A module can be an integral component in a print engine. For example, a development module is usually a component of a larger assembly that includes writing transfer and fuser modules such as are known in the art. Alternatively, a module can be self contained and can be made in a manner so that they are attached to other modules to produce a print engine. Examples of such modules include scanners, glossers, inverters that will invert a sheet of paper or other receiver to allow duplex printing, inserters that allow sheets such as covers or preprinted receivers to be inserted into documents being printed at specific locations within a stack of printed receiver sheets, and finishers that can fold, stable, glue, etc. the printed documents.

A print engine includes sufficient modules to produce prints. For example, a black and white electrophotographic print engine would generally include at least one development module, a writer module, and a fuser module. Scanner and finishing modules can also be included if called for by the intended applications.

A print engine assembly, also referred to in the literature as a reproduction apparatus, includes a plurality of print engines that have been integrally coupled together in a manner to allow them to print in a desired manner. For example, print engine assemblies that include two print engines and an inverter module that are coupled together to increase productivity by allowing the first print engine to print on one side of a receiver, the receiver then fed into the inverter module which inverts the receiver and feeds the receiver into the second print engine that prints on the inverse side of the receiver, thereby printing a duplex image.

A digital print engine is a print engine wherein the image is written using digital electronics. Such print engines allow the image to be manipulated, image by image, thereby allowing each image to be changed. In contrast, an offset press relies on the image being printed using press plates. Once the press plate is made, it cannot be changed. An example of a digital print engine is an electrophotographic print engine wherein the electrostatic latent image is formed on the PIM by exposing the PIM using a laser scanner or LED array. Conversely, an electrophotographic apparatus that relies on forming a latent image by using a flash exposure to copy an original document would not be considered a digital print engine.

A digital print engine assembly is a print engine assembly that a plurality of print engines of which at least one is a digital print engine.

Contrast is defined as the maximum value of the slope curve of the density versus log of the exposure. The contrast of two prints is considered to be equal if they differ by less than 0.2 ergs/cm$^2$ and preferably by less than 0.1 ergs/cm$^2$.

Print engine 30 may include a controller or logic and control unit (LCU) (not shown). The LCU may be a computer, microprocessor, application specific integrated circuit (ASIC), digital circuitry, analog circuitry, or a combination or plurality thereof. The controller (LCU) may be operated according to a stored program for actuating the workstations within print engine 30, effecting overall control of print engine 30 and its various subsystems. The LCU may also be programmed to provide closed-loop control of the print engine 30 in response to signals from various sensors and encoders. Aspects of process control are described in U.S. Pat. No. 6,121,986 incorporated herein by this reference.

A primary charging station 38 in print engine 30 sensitizes PIM 32 by applying a uniform electrostatic corona charge, from high-voltage charging wires at a predetermined primary voltage, to a surface 32*a* of PIM 32. The output of charging station 38 may be regulated by a programmable voltage controller (not shown), which may in turn be controlled by the LCU to adjust this primary voltage, for example by controlling the electrical potential of a grid and thus controlling movement of the corona charge. Other forms of chargers, including brush or roller chargers, may also be used.

An image writer, such as exposure station 40 in print engine 30, projects light from a writer 40*a* to PIM 32. This light selectively dissipates the electrostatic charge on photoreceptive PIM 32 to form a latent electrostatic image of the document to be copied or printed. Writer 40*a* is preferably constructed as an array of light emitting diodes (LEDs), or alternatively as another light source such as a Laser or spatial light modulator. Writer 40*a* exposes individual picture elements (pixels) of PIM 32 with light at a regulated intensity and exposure, in the manner described below. The exposing light discharges selected pixel locations of the photoreceptor, so that the pattern of localized voltages across the photoreceptor corresponds to the image to be printed. An image is a pattern of physical light, which may include characters, words, text, and other features such as graphics, photos, etc. An image may be included in a set of one or more images, such as in images of the pages of a document. An image may be divided into segments, objects, or structures each of which is itself an image. A segment, object or structure of an image may be of any size up to and including the whole image.

After exposure, the portion of PIM 32 bearing the latent charge images travels to a development station 42. Development station 42 includes a magnetic brush in juxtaposition to the PIM 32. Magnetic brush development stations are well known in the art, and are desirable in many applications; alternatively, other known types of development stations or devices may be used. Plural development stations 42 may be provided for developing images in plural gray scales, colors, or from toners of different physical characteristics. Full process color electrographic printing is accomplished by utilizing this process for each of four toner colors (e.g., black, cyan, magenta, yellow).

Upon the imaged portion of PIM 32 reaching development station 42, the LCU selectively activates development station 42 to apply toner to PIM 32 by moving backup roller 42*a* and PIM 32, into engagement with or close proximity to the magnetic brush. Alternatively, the magnetic brush may be moved toward PIM 32 to selectively engage PIM 32. In either case, charged toner particles on the magnetic brush are selectively attracted to the latent image patterns present on PIM 32, developing those image patterns. As the exposed photoreceptor passes the developing station, toner is attracted to pixel locations of the photoreceptor and as a result, a pattern of toner corresponding to the image to be printed appears on the photoreceptor. As known in the art, conductor portions of development station 42, such as conductive applicator cylinders, are biased to act as electrodes. The electrodes are connected to a variable supply voltage, which is regulated by a programmable controller in response to the LCU, by way of which the development process is controlled.

Development station 42 may contain a two-component developer mix, which includes a dry mixture of toner and carrier particles. Typically the carrier preferably includes high coercivity (hard magnetic) ferrite particles. As a non-limiting example, the carrier particles may have a volume-weighted diameter of approximately 30μ. The dry toner particles are substantially smaller, on the order of 6μ to 15μ in volume-weighted diameter. Development station 42 may include an applicator having a rotatable magnetic core within a shell, which also may be rotatably driven by a motor or other suitable driving means. Relative rotation of the core and shell moves the developer through a development zone in the presence of an electrical field. In the course of development, the toner selectively electrostatically adheres to PIM 32 to develop the electrostatic images thereon and the carrier material remains at development station 42. As toner is depleted from the development station due to the development of the electrostatic image, additional toner may be periodically introduced by a toner auger (not shown) into development station 42 to be mixed with the carrier particles to maintain a uniform amount of development mixture. This development mixture is controlled in accordance with various development control processes. Single component developer stations, as well as conventional liquid toner development stations, may also be used.

A transfer station 44 in printing machine 10 moves a receiver sheet 46 into engagement with the PIM 32, in registration with a developed image to transfer the developed image to receiver sheet 46. Receiver sheets 46 may be plain or coated paper, plastic, or another medium capable of being handled by the print engine 30. Typically, transfer station 44 includes a charging device for electrostatically biasing movement of the toner particles from PIM 32 to receiver sheet 46. In this example, the biasing device is roller 48, which engages the back of sheet 46 and which may be connected to a programmable voltage controller that operates in a constant current mode during transfer. Alternatively, an intermediate member may have the image transferred to it and the image may then be transferred to receiver sheet 46. After transfer of the toner image to receiver sheet 46, sheet 46 is detacked from PIM 32 and transported to fuser station 50 where the image is fixed onto sheet 46, typically by the application of heat and/or pressure. Alternatively, the image may be fixed to sheet 46 at the time of transfer.

A cleaning station 52, such as a brush, blade, or web is also located beyond transfer station 44, and removes residual toner from PIM 32. A pre-clean charger (not shown) may be located before or at cleaning station 52 to assist in this cleaning. After cleaning, this portion of PIM 32 is then ready for recharging and re-exposure. Of course, other portions of PIM 32 are simultaneously located at the various workstations of print engine 30, so that the printing process may be carried out in a substantially continuous manner.

A controller provides overall control of the apparatus and its various subsystems with the assistance of one or more sensors, which may be used to gather control process, input data. One example of a sensor is belt position sensor 54.

Figure 2:
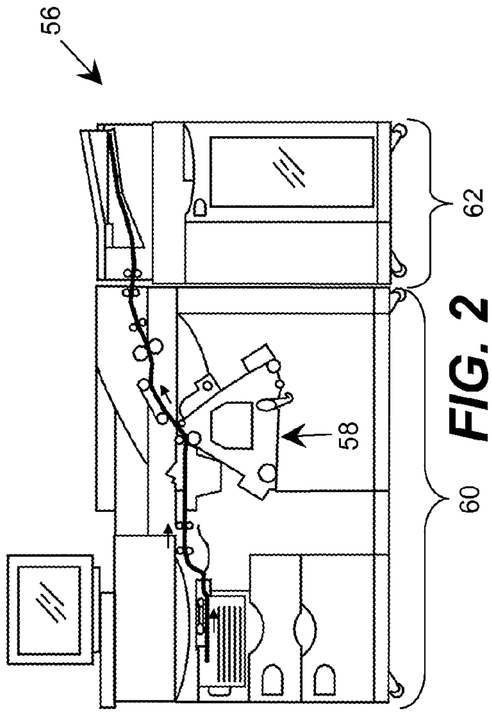
FIG. 2 schematically illustrates an embodiment of a reproduction apparatus having a first print engine.

FIG. 2 schematically illustrates an embodiment of a reproduction apparatus 56 having a first print engine 58 that is capable of printing one or a multiple of colors. The embodied reproduction apparatus will have a particular throughput, which may be measured in pages per minute (ppm). As explained above, it would be desirable to be able to significantly increase the throughput of such a reproduction apparatus 56 without having to purchase an entire second reproduction apparatus. It would also be desirable to increase the throughput of reproduction apparatus 56 without having to scrap apparatus 56 and replacing it with an entire new machine.

Quite often, reproduction apparatus 56 is made up of modular components. For example, the print engine 58 is housed within a main cabinet 60 that is coupled to a finishing unit 62. For simplicity, only a single finishing device 62 is shown, however, it should be understood that multiple finishing devices providing a variety of finishing functionality are known to those skilled in the art and may be used in place of a single finishing device. Depending on its configuration, the finishing device 62 may provide stapling, hole punching, trimming, cutting, slicing, stacking, paper insertion, collation, sorting, and binding.

Figure 3A:
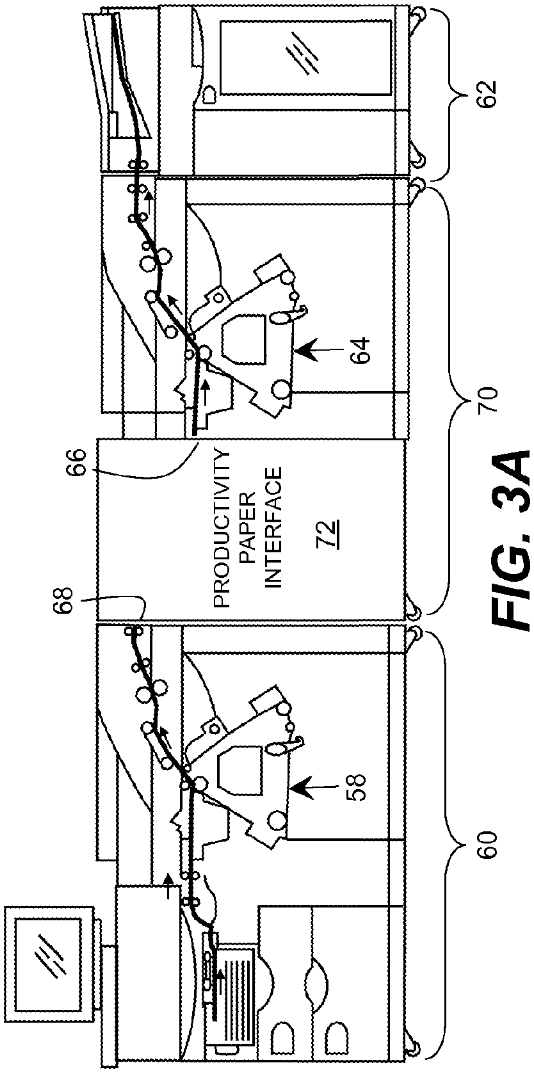
FIGS. 3A-3C schematically illustrate embodiments of a reproduction apparatus having a first print engine and a tandem second print engine from a productivity module.
Figure 3B:
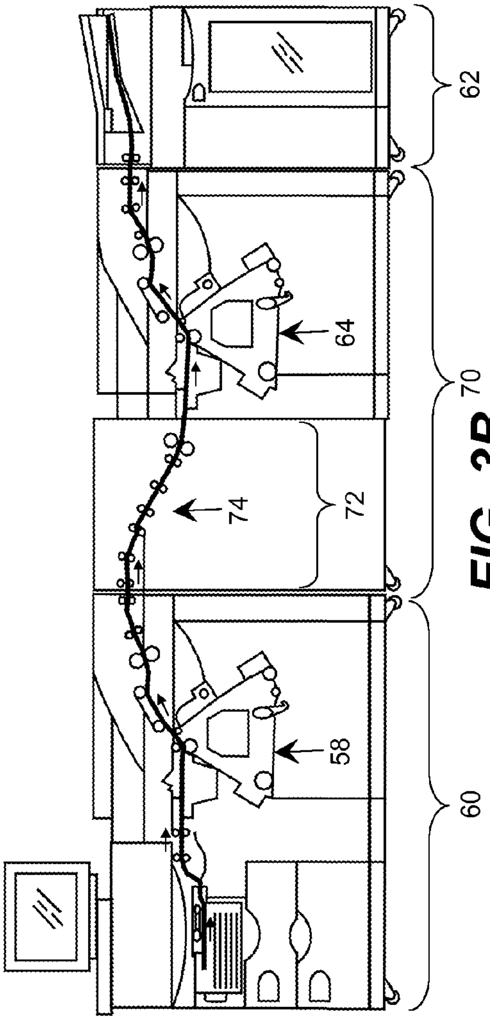
Figure 3C:
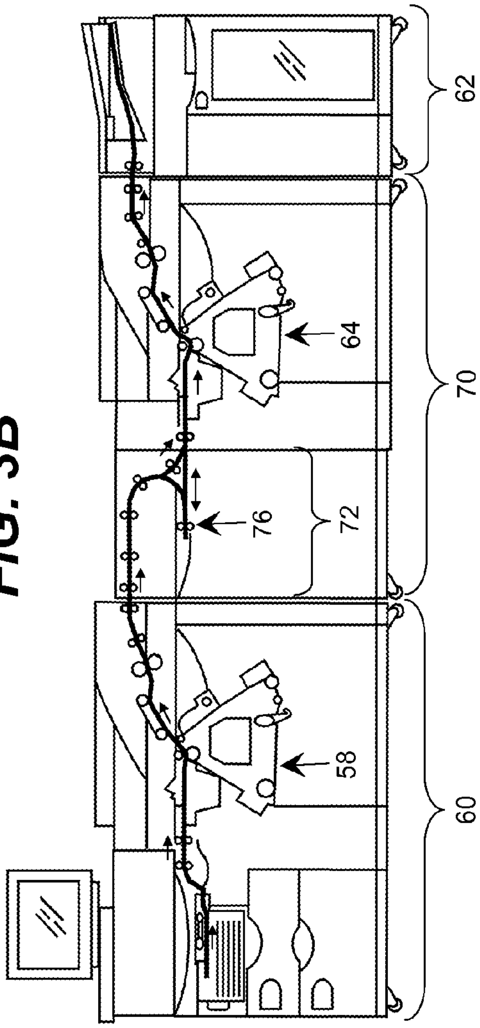

As FIG. 3A schematically illustrates, a second print engine 64 may be inserted in-line with the first print engine 58 and in-between the first print engine 58 and the finishing device 62 formerly coupled to the first print engine 58. The second print engine 64 may have an input paper path point 66 which does not align with the output paper path point 68 from the first print engine 58. Additionally, or optionally, it may be desirable to invert the receiver sheets from the first print engine 58 prior to running them through the second print engine (in the case of duplex prints). In such instances, the productivity module 70 which is inserted between the first print engine 58 and the at least one finisher 62 may have a productivity paper interface 72. Some embodiments of a productivity paper interface 72 may provide for matching 74 of differing output and input paper heights, as illustrated in the embodiment of FIG. 3B. Other embodiments of a productivity paper interface 72 may provide for inversion 76 of receiver sheets, as illustrated in the embodiment of FIG. 3C.

Providing users with the option to re-use their existing equipment by inserting a productivity module 70 between their first print engine 58 and their one or more finishing devices 62 can be economically attractive since the second print engine 64 of the productivity module 70 does not need to come equipped with the input paper handling drawers coupled to the first print engine 58. Furthermore, the second print engine 64 can be based on the existing technology of the first print engine 58 with control modifications which will be described in more detail below to facilitate synchronization between the first and second print engines.

Figure 4:
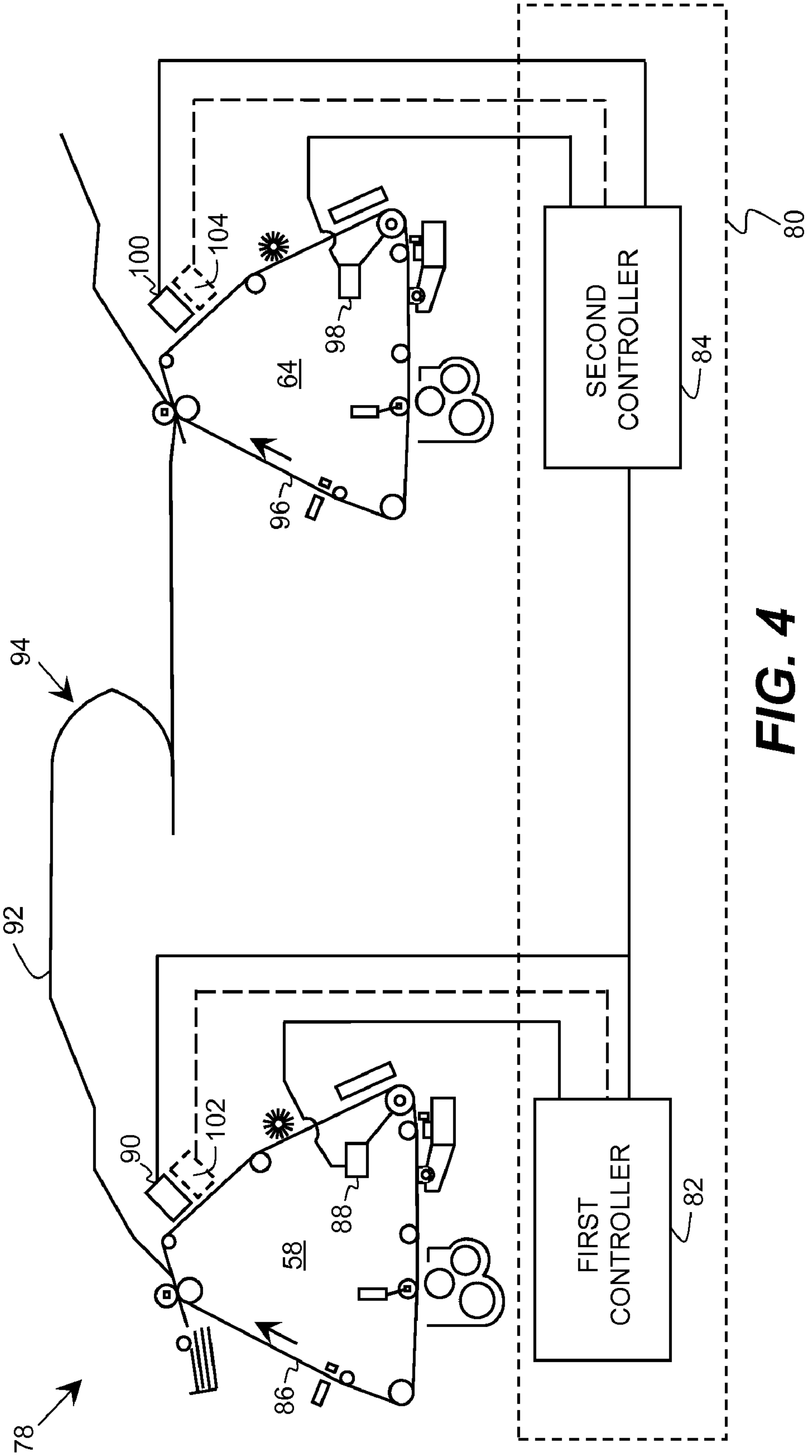
FIG. 4 schematically illustrates an embodiment of a reproduction or printing apparatus having embodiments of a first and second print engines.

FIG. 4 schematically illustrates an embodiment of a reproduction apparatus 78 having embodiments of first and second print engines 58, 64 which are synchronized by a controller 80. Controller 80 may be a computer, a microprocessor, an application specific integrated circuit, digital circuitry, analog circuitry, or any combination and/or plurality thereof. In this embodiment, the controller 80 includes a first controller 82 and a second controller 84. Optionally, in other embodiments, the controller 80 could be a single controller as indicated by the dashed line for controller 80. The first print engine 58 has a first primary imaging member (PIM) 86, the features of which have been discussed above with regard to the PIM of FIG. 1. The first PIM 86 also preferably has a plurality of frame markers corresponding to a plurality of frames on the PIM 86. In some embodiments, the frame markers may be holes or perforations in the PIM 86 which an optical sensor can detect.

In other embodiments, the frame markers may be reflective or diffuse areas on the PIM, which an optical sensor can detect. Other types of frame markers will be apparent to those skilled in the art and are intended to be included within the scope of this specification. The first print engine 58 also has a first motor 88 coupled to the first PIM 86 for moving the first PIM when enabled. As used here, the term "enabled" refers to embodiments where the first motor 88 may be dialed in to one or more desired speeds as opposed to just an on/off operation. Other embodiments, however, may selectively enable the first motor 88 in an on/off fashion or in a pulse-width-modulation fashion.

The first controller 82 is coupled to the first motor 88 and is configured to selectively enable the first motor 88 (for example, by setting the motor for a desired speed, by turning the motor on, and/or by pulse-width-modulating an input to the motor). A first frame sensor 90 is also coupled to the first controller 82 and configured to provide a first frame signal, based on the first PIM's plurality of frame markers, to the first controller 82.

A second print engine 64 is coupled to the first print engine 58, in this embodiment, by a paper path 92 having an inverter 94. The second print engine 64 has a second primary imaging member (PIM) 96, the features of which have been discussed above with regard to the PIM of FIG. 1. The second PIM 96 also preferably has a plurality of frame markers corresponding to a plurality of frames on the PIM 96. In some embodiments, the frame markers may be holes or perforations in the PIM 96, which an optical sensor can detect. In other embodiments, the frame markers may be reflective or diffuse areas on the PIM which an optical sensor can detect. Other types of frame markers will be apparent to those skilled in the art and are intended to be included within the scope of this specification. The second print engine 64 also has a second motor 98 coupled to the second PIM 96 for moving the second PIM 96 when enabled. As used here, the term "enabled" refers to embodiments where the second motor 98 may be dialed in to one or more desired speeds as opposed to just an on/off operation. Other embodiments, however, may selectively enable the second motor 98 in a pulse-width-modulation fashion.

The second controller 84 is coupled to the second motor 98 and is configured to selectively enable the second motor 98 (for example, by setting the motor for a desired speed, or by pulse-width-modulating an input to the motor). A second frame sensor 100 is also coupled to the second controller 84 and configured to provide a second frame signal, based on the second PIM's plurality of frame markers, to the second controller 84. The second controller 84 is also coupled to the first frame sensor 90 either directly as illustrated or indirectly via the first controller 82 which may be configured to pass data from the first frame sensor 90 to the second controller 84.

While the operation of each individual print engine 58 and 64 has been described on its own, the second controller 84 is also configured to synchronize the first and second print engines 58, 64 on a frame-by-frame basis. Optionally, the second controller 84 may also be configured to synchronize a first PIM splice seam from the first PIM 86 with a second PIM splice seam from the second PIM 96. In the embodiments that synchronize the PIM splice seams, the first print engine 58 may have a first splice sensor 102 and the second print engine 64 may have a second splice sensor 104. In other embodiments, the frame sensors 90, 100 may be configured to double as splice sensors. This method can be applied to other problem areas besides seams, such as non-printable areas that the image would not print on well or at all. Another example of a black and white area is one that has a defect or flaw or even a cutout or hole punch. Other examples include preprinted areas and different surfaces, such as a plastic overlay. A black and white area could even be an area that a customer wanted left blank for some other reason and could be printed if desired.

The average arrival time is defined as and of the sheet arrival time is not necessarily the same but are relatable as discussed below. This program should be run whenever timing is likely to have changed significantly such as upon installation, replacement of parts or components, or when there has been significant wear. This can be signaled by a machine generated code indicating that the sheet arrival time was approaching the input latitude of the registration or likely to impinge upon a nonimagable portion of the PIM.

In one embodiment the synchronization method relies on timing the slave engine to the master engine using optimum offset timings. The master engine and the slave engine are referred to elsewhere alternately as the first engine and the second engine for simplicity. Note that the master engine could be either the first or second engine or any one of a series of engines as long as there is a master and the slave engine(s) timing is set by the timing of the master engine. The bottom line is that, to get good position precision, it is important to know where the receiver is relative to a fixed position. The master can be the second engine, so one could, in principle, time the first engine off the second, which would be the master. Also the digital print assembly consists of more than only two print engines. For example, suppose we couple 2 NexPress 3000s with an inverter between the engines. That is why I used the term "plurality". Also, please note that the slave for one pair of print engines can become the master for a new set. Example: Suppose there are 3 print engines and engine 1 is the master for timing engine 2. Once the paper is in engine 2, engine 2 can become the master for timing engine 3. This sliding master scenario has the advantage of minimizing the propagation of timing errors.

Locating the seams on the two PIMs can be done, but it then requires that the engine be timed very accurately. This is problematical and does not allow for engine speed variations when one switches from one type or weight of receiver to another. Moreover, the seam may not be very sharp. In fact, they are often overcoated with an adhesive to minimize the offset between the two mating surfaces. This would preclude precise determination of the position with a sensor so that the use of a seam position relative to a fixed position is preferred as described in this present synchronization method.

The efficiency and accuracy of synchronizing the engines is function of the number of timing samples measured in a given period. The efficiency and accuracy are improved with an increasing number of timing samples. As there typically are between four and six frame markers on a PIM, the engines can be synchronized much faster than relying solely on locating a single fiducial on the PIM such as a seam. In addition, the adjustments to the speed of the slave engine is more accurate and the changes to the speed converge more rapidly to the desired synchronization.

In the copending patent application Ser. No. 12/468,286, the service program that runs the master print engine of a plurality of coupled print engines synchronizes the slave print engines to the master print engine upon commencement by running in a non-invert mode using preset or default engine timing for the smallest frame size. The time between the marking engine timing reference of the slave engine, also referred to as marking engine 2 and the sheet arrival time at a pre-registration speed adjustment sensor is measured. As variations in this time can occur, it is often desirable to obtain an average time rather than using a single time. The average time is compared to the target value. If the two values coincide, no adjustment of the synchronization time delay for any frame mode is made. If the average time is less than the target time, the offset is decreased by the target-average timing error. Conversely, if the target time is less than the average time, the synchronization time is increased for all frame modes by the average target timing error. This is accomplished by determining the position of timing marks on the primary imaging member of the first print engine, directing a receiving sheet from the first print engine to the second print engine, determining the arrival time of the receiving sheet in the second print engine, and synchronizing the timing of the second engine using the timing marks on the first engine and the actual arrival time of the sheet from the first to the second engine. It should be noted that the timing marks can correspond to permanent marks such as a splice or perforation in the photoreceptor. Alternatively, the marks can be produced within the master and slave engines. Examples include marks that are developed onto the photoreceptors of each engine using a test target.

In a less preferred mode of practicing this invention, this invention comprises method of synchronizing the timing of a plurality of physically coupled print engines wherein the receiving sheet is inverted between a first and a second print engine including determining the position of timing marks on the primary imaging member of the first print engine, directing a receiving sheet from the first print engine to the second print engine without inverting, determining the arrival time of the receiving sheet in the second print engine and synchronizing the timing of the second engine using the timing marks on the first engine and the actual arrival time of the sheet from the first to the second engine.

In one embodiment the timing marks on the primary imaging member of the first print engine are made by the first print engine.

While the term master and first print engine are often used interchangeable, as are the terms slave and second print engine, it is clear from the use of the terms that any engine within the series of coupled print engines can serve as the master and any others can serve as slaves. Moreover, a specific print engine can be a slave to one print engine, but the master to another.

Figure 5:
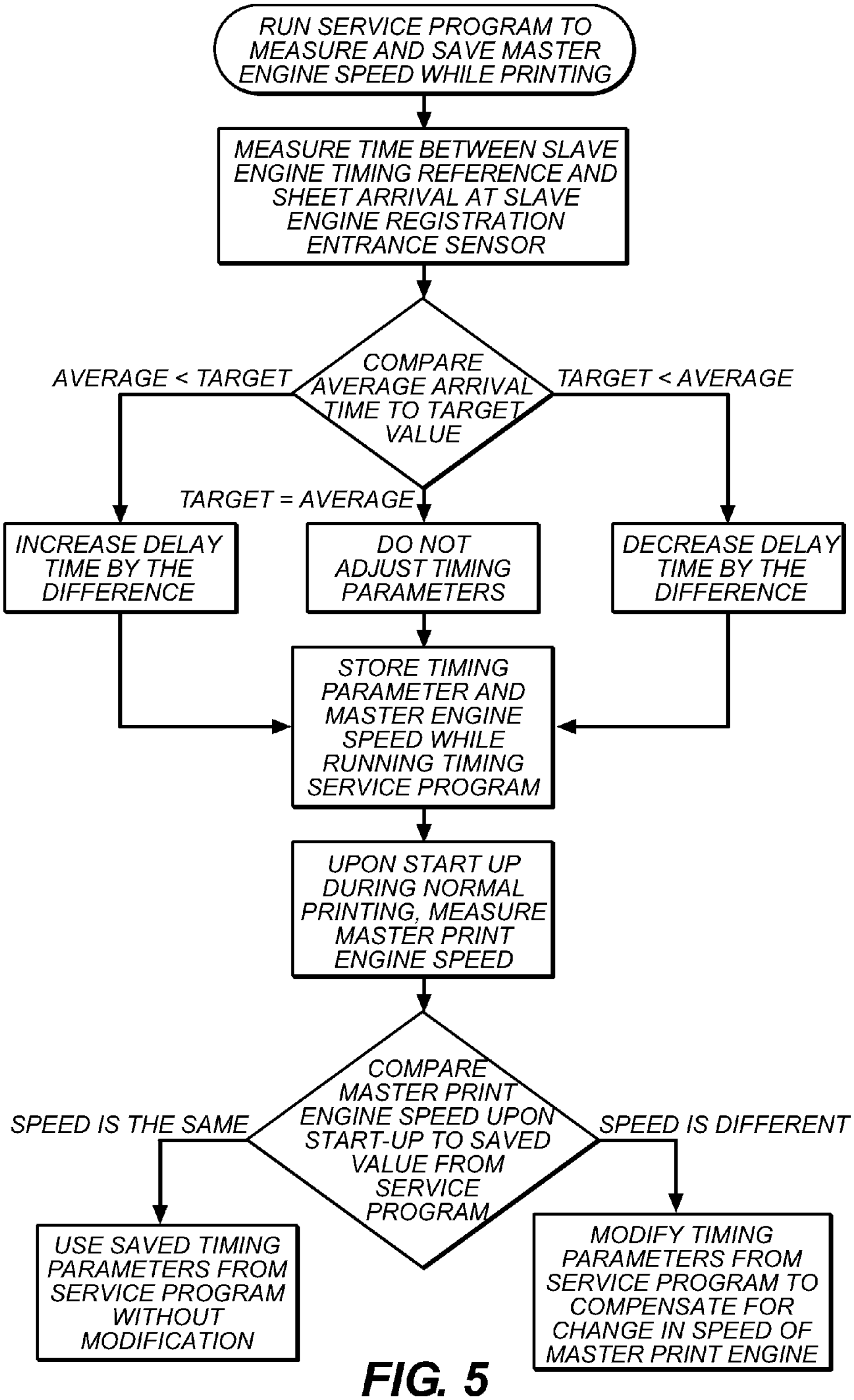
FIG. 5 shows a flow chart representing the process by which the timing parameters in the slave engine are modified to compensate for changes in engine speed.

FIG. 5 shows a schematic of how the present invention operates in a preferred mode of operation comprising two print engines, for example two black and white engines, coupled to each other through an inverter. While this discussion focuses on this preferred mode of operation, it is clear that it equally applies to other applications that may or may not comprise an inverter. For example, the present invention equally well applies to a print engine comprising a plurality of engines such as a color engine whereby full color prints are produced by separately printing on separate engines those colors comprising the subtractive primary colors cyan, magenta, yellow, and black. The present invention also applies to a series of coupled print engines comprising a plurality of print engines, each of which prints a different color on one side of a receiver, inverts the receiver, and an additional plurality of printers prints an image on the second side of the receiver.

This invention addresses the problem that, even after initial calibration, the timing of the slave engine can vary causing it to print in non-imaging regions of the PIM. Specifically, speed variations in the slave engine can occur because variations in line frequency can have different effects on some drive motors than on other drive motors. In addition, wear of components can affect speed. Finally, changing components such as photoreceptive drums or other PIMs, fusing rollers, etc. can affect speed. This invention discloses a method to independently tune the various timing parameters in the slave print engine in a highly expedient manner in digital print engines, preferably electrophotographic print engines comprising a plurality of module, each of which can print at least a single color. This is predicated by adjusting the speed of the slave engine to match the speed of the master engine as described in patent application Ser. Nos. 12/126,192 and 12/126,267. Specifically, the measured speed of the first engine is used to calculate the timing adjustments for both the first and second engines. It is faster and more accurate to use the speed of the master print engine, rather than simply measuring and adjusting the timing parameters of the slave engine based on independent measurements of the speeds of the slave engines. As described in this patent, a slave engine to a particular master engine can be a master engine to a different slave engine in instances when a multiple of print engines, in excess of two print engines, are coupled together.

In this invention, the tuning of the timing parameters of a plurality of physically coupled print engines is accomplished using a method including determining any change in the speed of the master print engine relative to the speed at original set up and adjusting the timing parameters within the slave print engines based on the speed of the master engine.

This is accomplished by adjusting the timing parameters of the elements within the slave print engines by varying the timing delay within slave print engines so that the timing of the delivery of the sheet to the slave engine registration assembly is maintained. In some instances such as when there are no nonprintable areas on the PIM, this can be accomplished by adjusting the timing of the writer. In one preferred mode of operation where an inverter is coupled between two print engines, synchronization can be maintained between the master and slave print engines by adjusting the timing of the receiver sheet feed from the inverter.

In another preferred mode of practicing this invention, where registration is controlled by an image encoder, the synchronization pulse for the preregistration pulse for the speed adjust unit is adjusted to control the timing of sheet delivery to registration.

Figure 6:
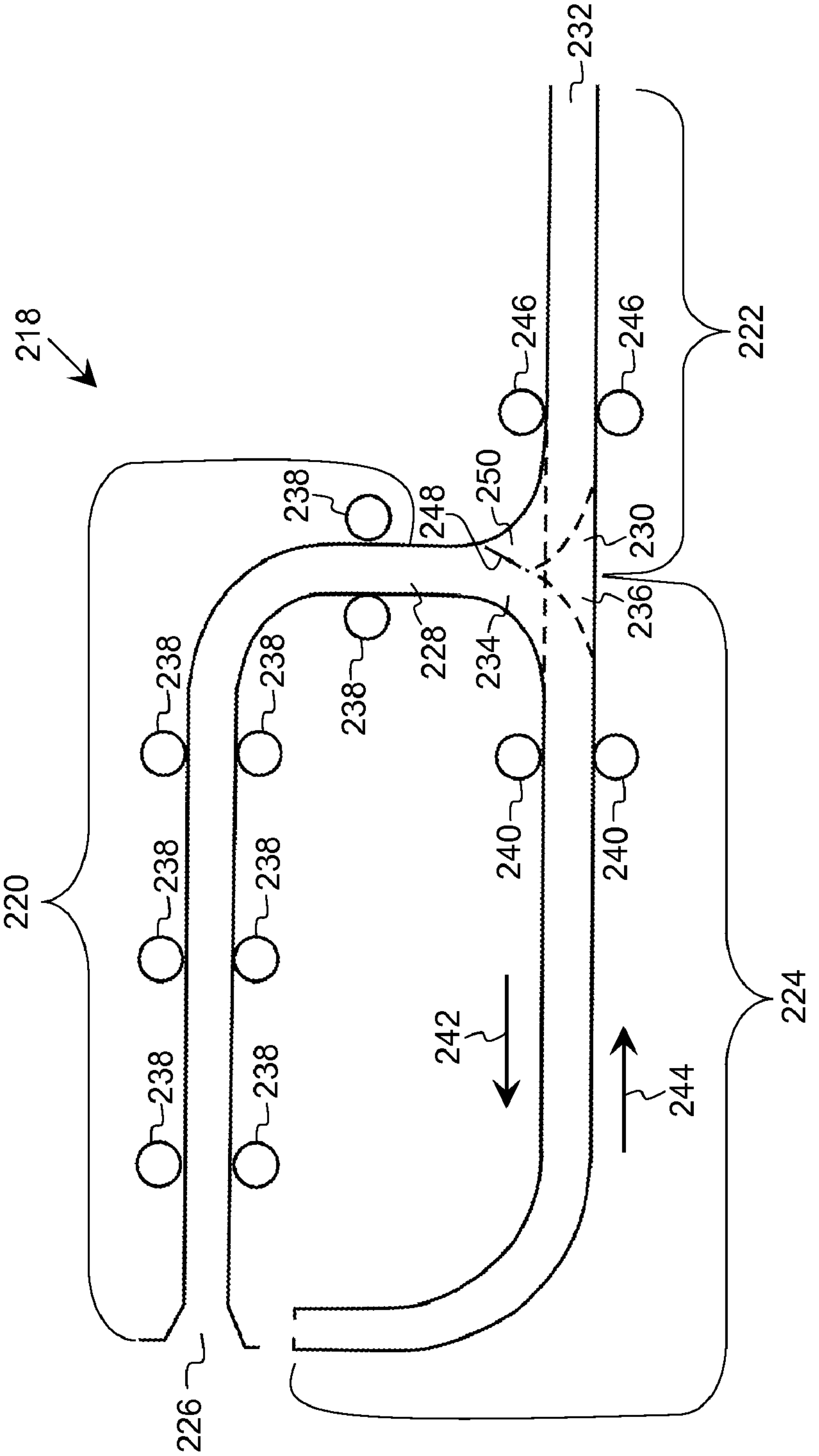
FIG. 6 schematically illustrates an embodiment of the inverter paper path.

An additional benefit of this invention is that it provides method of reducing paper buckling at the transition between the fixed and variable speed portions of an engine by operating the speeds of components whose speeds do not change under voltage or load conditions to apply tension to the paper. To achieve this benefit when using a pair of digital print engines coupled through an inverter, it is necessary that the entrance speed to the inverter is faster than the speed of the paper path of the engine immediately preceding the inverter. Referring to FIG. 6, the speed of the inverter rollers 240 should be greater than the rollers 238 immediately preceding the inverter at the time the sheet is in contact with both rollers. As compliance in the system can compensate for a small degree of speed mismatches, the entrance speed to the inverter is between 3% slower and 7% faster, preferably between 1% slower and 5% faster than the variations of speed of the paper path of the engine immediately preceding the inverter. Slower speeds will result in buckling of the receiver sheets. Faster speeds will result in crinkling and possibly tearing the receiver sheets. For similar reasons, it is necessary that the exit speed from the inverter is slower than the speed of the paper path of the engine immediately following the inverter. Once again referring to FIG. 6, the speed of inverter rollers 240 should be less than the rollers 246 immediately following the inverter at the time the sheet is in contact with both rollers. Specifically, the exit speed from the inverter is between 7% slower and 3% faster, preferably 5% slower and 1% faster, than the variations of speed of paper path of the engine immediately following the inverter.

The invention has been described in detail with particular reference to certain preferred embodiments thereof, but it will be understood that variations and modifications can be effected within the spirit and scope of the invention.

What is claimed is:

1. A method for maintaining the synchronization of the timing of a plurality of physically coupled print engines comprising:

determining a change in the speed of a master print engine, from a first speed to a second speed, relative to an original speed of the master print engine at an original set up speed; and adjusting a timing parameter within a slave print engine based on the printing speed of the master engine to adjust the slave print engine speed relative to the master print engine speed and maintain a relative timing operating the printer speed of one or more printer components, whose speeds do not change under voltage or load conditions to apply tension to the paper and reduce paper buckling at a transition between a fixed and a variable speed portion of the engine, wherein an inverter entrance speed is faster than a paper path speed of an engine immediately preceding the inverter and the inverter entrance speed is between 3% slower and 7% faster than any variations of a paper path speed of an engine immediately preceding the inverter.

2. The method according to claim 1 wherein the timing offset is maintained by adjusting a timing of the writer.

3. The method according to claim 1 wherein the timing offset of the slave print engine is adjusted by varying the timing parameters within slave print engine so that the timing of the delivery of the sheet to a slave engine registration assembly is maintained.

4. The method according to claim 3 wherein the relative timing is maintained by adjusting a receiver sheet feed from an inverter parameter.

5. The method according to claim 3 wherein the relative timing is maintained by adjusting a pulse for preregistration speed adjust unit to control the timing of sheet delivery to registration.

6. A method for maintaining the synchronization of the timing of a plurality of physically coupled print engines comprising:

determining a change in the speed of a master print engine, from a first speed to a second speed, relative to an original speed of the master print engine at an original set up speed; and adjusting a timing parameter within a slave print engine based on the printing speed of the master engine to adjust the slave print engine speed relative to the master print engine speed and maintain a relative timing operating the printer speed of one or more printer components, whose speeds do not change under voltage or load conditions to apply tension to the paper and reduce paper buckling at a transition between a fixed and a variable speed portion of the engine, wherein an inverter exit speed is slower than a paper path speed of an engine immediately following the inverter and wherein an inverter exit speed is between 7% slower and 3% faster than the variations a paper path speed of an engine immediately following the inverter.

7. The method according to claim 6 wherein an inverter entrance speed is between 1% slower and 5% faster than the variations a paper path speed of an engine immediately preceding the inverter.

8. The method according to claim 6 wherein an inverter exit speed is between 5% slower and 1% faster than variations of a paper path speed of an engine immediately following the inverter.

9. A method for maintaining the synchronization of the timing of a plurality of physically coupled print engines comprising:

determining a change in the speed of a first print engine, when at a printing speed, relative to an original speed of the first print engine at an original set up speed;

adjusting a timing parameter to maintain timing within a second print engine based on the printing speed of the first engine; and using a controller to store and estimate changes in the speed of the first print engine and an estimated location of one or more non-printable areas and maintaining an optimum timing offset using the one or more timing marks, the average arrival time of the receiving sheet and the estimated location of the non-printable area such that the calculated changes in the speed are compared to a previous speed and an estimated non-printable area to prevent printing on the non-printable area wherein the timing offset of the slave print engine is adjusted by varying the timing parameters within the slave mint engine so that the timing of the delivery of the sheet to a slave engine registration assembly is maintained and wherein an inverter entrance speed is faster than a paper path speed of an engine immediately preceding the inverter and an inverter entrance speed is between 3% slower and 7% faster than variations of a paper path speed of an engine immediately preceding the inverter.

10. The method according to claim 9 wherein the timing is maintained by adjusting a timing of the writer.

11. The method according to claim 9 wherein the timing is maintained by adjusting a receiver sheet feed from the inverter parameter.

12. The method according to claim 9 wherein the timing offset is maintained by adjusting a pulse for the preregistration speed adjust unit to control the timing of sheet delivery to registration.

13. The method according to claim 9 wherein an inverter exit speed is between 7% slower and 3% faster than the variations a paper path speed of an engine immediately following the inverter.

* * * * *